(12) United States Patent
Harwood et al.

(10) Patent No.: US 8,477,967 B2
(45) Date of Patent: *Jul. 2, 2013

(54) ACOUSTIC REFLECTOR AND ENERGY STORAGE FOR MEDIA ASSEMBLIES

(75) Inventors: Ronald Paul Harwood, Farmington Hills, MI (US); Kenneth Alan Klemmer, Birmingham, MI (US); Larry Alan Schirmer, Rochester Hills, MI (US)

(73) Assignee: Ronald Paul Harwood, Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,103

(22) Filed: Dec. 19, 2011

(65) Prior Publication Data

US 2012/0087520 A1    Apr. 12, 2012

Related U.S. Application Data (63) Continuation of application No. 12/631,943, filed on Oct. 7, 2009, now Pat. No. 8,098,852.

(51) Int. Cl.
*H04R 25/00* (2006.01)
*H04R 9/06* (2006.01)
*H05K 5/00* (2006.01)

(52) U.S. Cl.
USPC .................. 381/160; 381/336; 181/153

(58) Field of Classification Search
USPC .................. 381/160, 333, 338; 181/188, 199, 181/205, 207, 209, 151, 153, 155
See application file for complete search history.

(56) References Cited

U.S. PATENT DOCUMENTS 3,326,321 A   6/1967   Valuch
3,329,235 A   7/1967   Shaper
(Continued)

FOREIGN PATENT DOCUMENTS

| DE | 19527499 C1 | 7/1996 |
| DE | 102005050231 A1 | 4/2007 |
| GB | 1460753 | 1/1977 |
| WO | 9615645 A1 | 5/1996 |

OTHER PUBLICATIONS

International Search Report and Written Opinion for Application No. PCT/US10/58896, mailed Apr. 6, 2011, 10 pages.

(Continued)

*Primary Examiner* — Curtis Kuntz
*Assistant Examiner* — Sunita Joshi
(74) *Attorney, Agent, or Firm* — Brooks Kushman P.C.

(57) ABSTRACT

A speaker assembly is provided with a housing, a speaker mounted to the housing, and a reflector spaced apart from and facing the speaker. The reflector is symmetrical and has an arcuate central convex region for reflecting pressure back to the speaker for amplifying back pressure to the speaker. The reflector has a secondary region with an arcuate cross-section for reflecting acoustic vibrations past and outboard of the housing. The reflector is partially translucent, and a light source is provided adjacent the reflector for conveying light to the reflector, past and outboard of the housing for illuminating a region that receives acoustic vibrations reflected from the reflector. A media assembly is provided with a fan operably connected to a generator so that air that passes into a housing through an inlet and out of an outlet, causes the fan to rotate thereby providing a power source to a media device.

19 Claims, 9 Drawing Sheets

U.S. PATENT DOCUMENTS

| | | | |
|---|---|---|---|
| 3,818,138 A | | 6/1974 | Sperrazza, Jr. |
| 4,063,387 A | | 12/1977 | Mitchell |
| 4,200,904 A | * | 4/1980 | Doan ............................ 362/183 |
| 4,348,549 A | | 9/1982 | Berlant |
| 4,474,258 A | * | 10/1984 | Westlund ...................... 181/151 |
| 4,836,329 A | | 6/1989 | Klayman |
| 4,908,601 A | | 3/1990 | Howze |
| 5,525,767 A | | 6/1996 | Fields |
| 5,721,401 A | | 2/1998 | Sim |
| 5,832,099 A | | 11/1998 | Wiener |
| 5,988,314 A | | 11/1999 | Negishi |
| 5,995,634 A | | 11/1999 | Zwolski |
| 6,345,685 B1 | | 2/2002 | Wells et al. |
| 6,461,752 B1 | | 10/2002 | Leung |
| 6,598,842 B1 | | 7/2003 | Yeh |
| 6,769,509 B2 | | 8/2004 | Harwood |
| 6,957,715 B2 | | 10/2005 | Christiansen |
| 7,219,873 B2 | | 5/2007 | Harwood |
| 7,606,379 B2 | * | 10/2009 | Ivey et al. ..................... 381/160 |
| 7,607,512 B2 | | 10/2009 | Harwood |
| 2004/0070518 A1 | | 4/2004 | Whittle, Jr. et al. |
| 2006/0043737 A1 | | 3/2006 | Ashikian |
| 2006/0231328 A1 | | 10/2006 | Moore |
| 2007/0045040 A1 | * | 3/2007 | Harwood ...................... 181/199 |
| 2009/0267540 A1 | | 10/2009 | Chemel et al. |
| 2010/0162685 A1 | * | 7/2010 | Hirshberg ...................... 60/266 |

OTHER PUBLICATIONS

U.S. Appl. No. 12/888,545, Acoustic Reflector, filed Sep. 23, 2010, 19 pages.
Soundsphere Loudspeakers, Model 110B Loudspeaker, 2008, Sonic Systems, Inc., 2 pages.
Soundsphere Loudspeakers, Model Q-6 Loudspeaker, 2006, Sonic Systems, Inc., 2 pages.
Soundsphere Loudspeakers, Model Q-8 Loudspeaker, 2007, Sonic Systems, Inc., 2 pages.
Soundsphere Loudspeakers, Model Q-12A Loudspeaker, 2008, Sonic Systems, Inc., 2 pages.
Soundsphere Loudspeakers, Model Q-15 Loudspeaker, 2008, Sonic Systems, Inc., 2 pages.
Soundsphere Loudspeakers, Model Q-LB Loudspeaker, 2006, Sonic Systems, Inc., 2 pages.
Soundsphere Loudspeakers, Model Q-SB2 Loudspeaker, 2008, Sonic Systems, Inc., 2 pages.
European Search Report for corresponding Application No. 10836454.8, mailed Apr. 3, 2013, 7 pages.

* cited by examiner

ACOUSTIC REFLECTOR AND ENERGY STORAGE FOR MEDIA ASSEMBLIES

CROSS-REFERENCE TO RELATED APPLICATIONS

This application is a continuation of U.S. application Ser. No. 12/631,943 filed Dec. 7, 2009, now U.S. Pat. No. 8,098,852 B2, the disclosure of which is incorporated in its entirety by reference herein.

TECHNICAL FIELD

Various embodiments relate to media assemblies with an acoustic reflector or an energy storage device.

BACKGROUND

Many outdoor and indoor public areas utilize speakers, speaker systems or public address systems for reproducing sound in these areas. These areas may include city streets, parks, residential neighborhoods, office buildings, campus areas, exterior walkways, shopping malls, casinos, atriums, and the like. These areas typically utilize speakers or speaker systems that are mounted to existing building structures, structural poles, or the like. Much effort is employed in installation of these systems and protecting these speaker systems from vandalism, wind load and/or the weather. Also, efforts have been directed towards protecting the associated wires or cables provided to these speaker systems. The prior art provides a plurality of methods and apparatuses for mounting speakers and speaker systems in public areas. The prior art also provides apparatuses for protecting these speakers from the elements. Further, the prior art has offered solutions for concealing speakers systems in public areas. Two prior art examples include Harwood U.S. Pat. No. 6,769,509 B2; and Harwood U.S. Pat. No. 7,219,873 B2.

SUMMARY

According to at least one embodiment, a speaker assembly is provided with a housing having a resonating chamber. A speaker is mounted to the housing in cooperation with the resonating chamber. A reflector is spaced apart from and faces the speaker. The reflector is symmetrical about a center axis that is generally coaxial with the speaker. The reflector has a central convex region for reflecting pressure back to the speaker for amplifying back pressure of the speaker. The reflector has a secondary region with a concave cross-section oriented about the central region for reflecting acoustic vibrations past and outboard of the housing.

According to at least one embodiment, a speaker assembly is provided with a speaker mounted to a housing. A reflector is spaced apart from and faces the speaker. The reflector is symmetrical about a center axis that is generally coaxial with the speaker. The reflector has a central arcuate convex region. The reflector has a secondary region with a concave arcuate cross-section oriented about the central region for reflecting acoustic vibrations past and outboard of the housing.

A media assembly is provided with a housing, and a speaker mounted to the housing. A translucent acoustic reflector is spaced apart from and faces the speaker for reflecting acoustic vibrations past and outboard of the housing to a first region. A light source is oriented proximate to the reflector to convey light through the reflector, past and outboard of the housing for illuminating a second region that at least partially includes a first region.

Another media assembly is provided with a housing having an inlet and an outlet. A media device is oriented in the housing for providing a media operation. A generator is mounted in the housing in electrical communication with the media device. A fan is operably connected to the generator and oriented in the housing so that air that passes into the housing through the inlet and out of the housing through the outlet, causes the fan to rotate thereby operating the generator and providing a power source to the media device.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
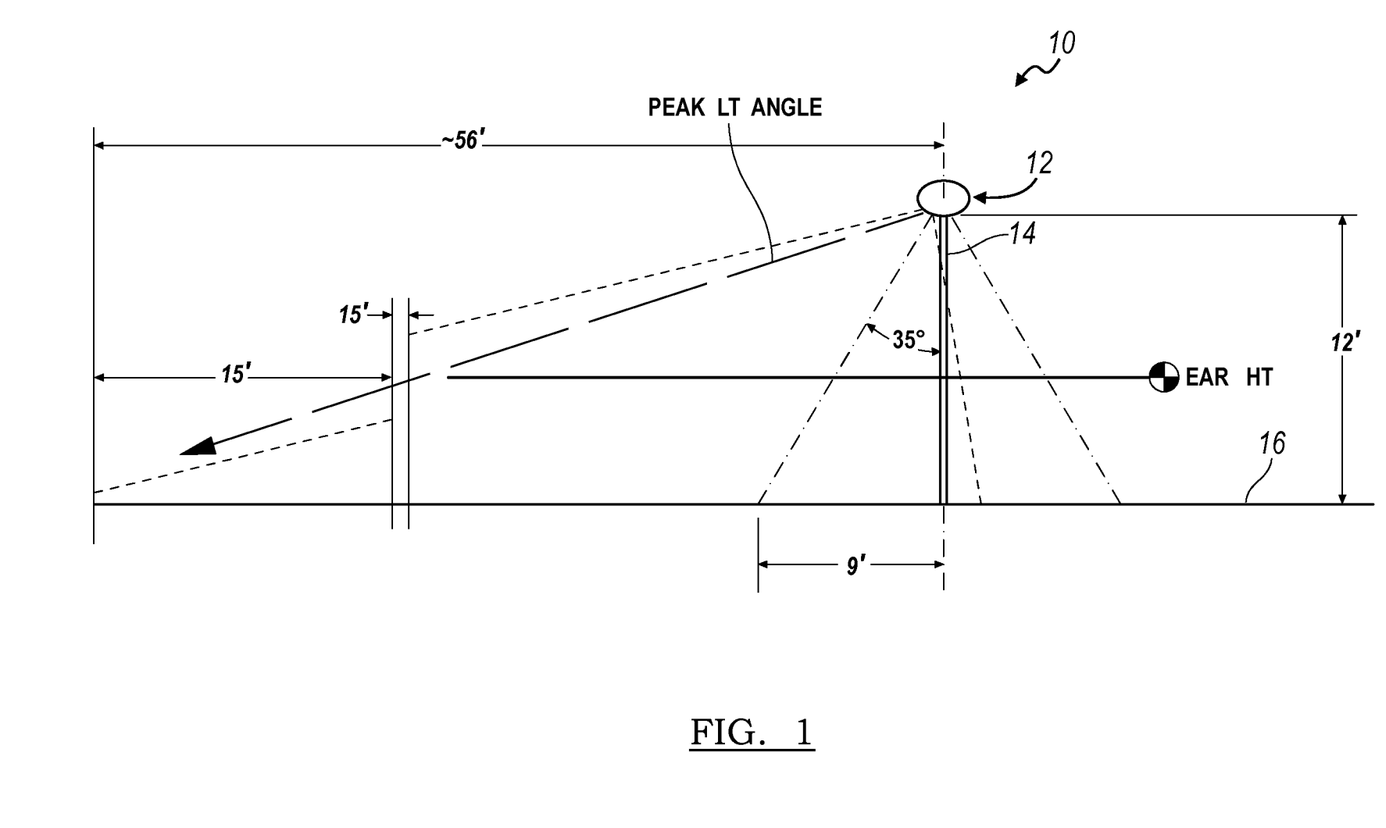
FIG. 1 is a side elevation schematic view of a media assembly according to an embodiment.

Referring now to FIG. 1, a media assembly is illustrated according to at least one embodiment and is referenced generally by numeral 10. The media assembly 10 includes a combination of a luminaire and a speaker assembly 12. The luminaire and speaker assembly 12 is illustrated mounted upon a structural pole 14 for supporting the luminaire and speaker assembly 12 upon an underlying support surface 16 and for elevating the luminaire and speaker assembly 12 above the underlying support surface 16. Although the media assembly 10 is illustrated mounted to a structural pole 14, the invention contemplates various structural supports for the media assembly, including street poles, light poles, sign poles, direct surface mounting, pendant lighting, catenary lighting, or the like.

Prior art speaker assemblies that focus a single speaker directly downward provide a cone of approximately seventy degrees, or thirty-five degrees from center as illustrated in FIG. 1. Such prior art speaker assemblies provide a limited range of coverage, which may be far exceeded by the range of coverage provided by the light assembly, which is illustrated by a peak light angle, which is a cone of approximately 156 degrees, or seventy-eight degrees from center. The luminaire and speaker assembly 12 utilizes a reflector for transmitting the acoustic vibrations within a cone of approximately 156 degrees, or seventy-eight degrees from center to coincide with the coverage provided by the luminaire.

By elevating the luminaire and speaker assembly 12 to a height of twelve feet for example, the light may be conveyed outward at a fifty-six foot radius. Likewise, the sound may be transmitted at a fifty-six foot radius as opposed to a nine foot radius provided by the prior art. Although the range of light is viewed as the illuminated underlying support surface 16, the range of sound should be measured from an average ear height, such as five feet from the ground. Therefore, given the dimension examples describe above, a sound output range of an almost forty foot radius is provided, permitting spacing of the media assemblies 10 by eighty feet. Through empirical testing at heights of the luminaire and speaker assembly 12 of twelve to twenty feet above ground, it has been determined that a range with a radius of 2.6 times the height can be provided with even sound distribution at an ear height of five feet.

Figure 2:
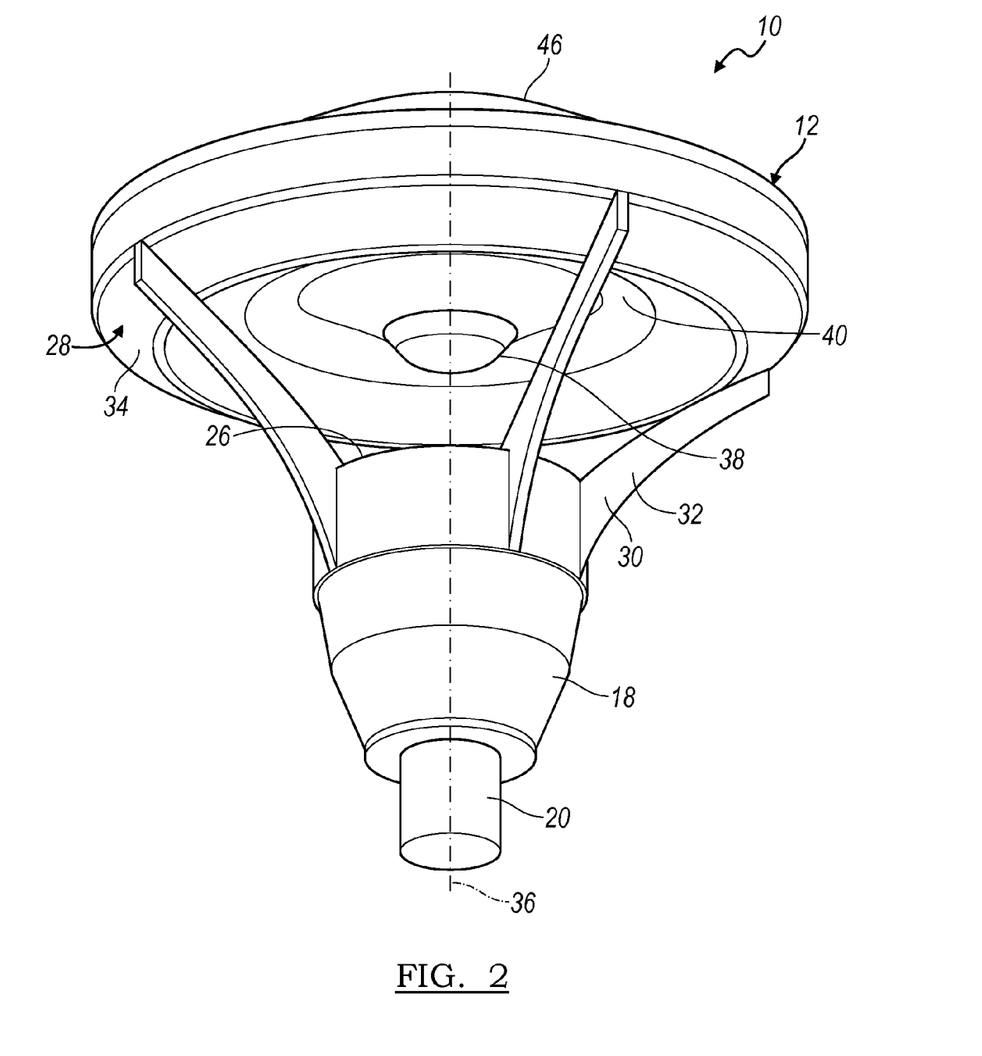
FIG. 2 is a perspective view of a media assembly according to an embodiment.
Figure 3:
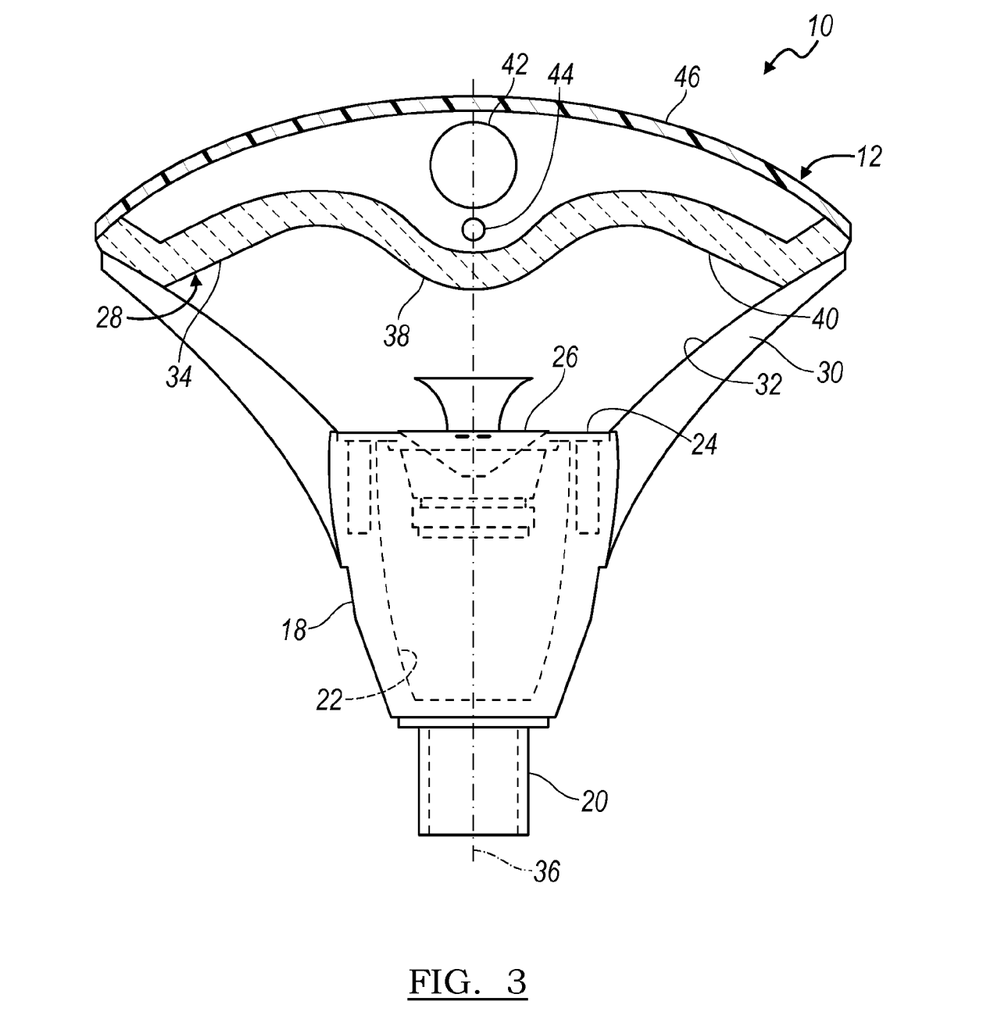
FIG. 3 is a side elevation view of the media assembly of FIG. 2.

Referring now to FIGS. 2 and 3, the media assembly 10 is illustrated in greater detail. The media assembly 10 includes a speaker housing 18, which is attached to a modular tenon adaptor 20 for mounting the speaker housing 18 upon the structural pole 14. The speaker housing 18 is generally hollow, thereby providing a resonating chamber 22. The speaker housing 18 has an opening 24 for receiving a speaker 26, which encloses the resonating chamber 22. The speaker 26 is oriented facing generally upward to direct the acoustic output at a reflector 28. The reflector 28 redirects the acoustic vibrations from the speaker 26 toward the underlying support surface 16 illustrated in FIG. 1.

Referring again to FIGS. 2 and 3, the reflector 28 is supported at an orientation that is spaced apart from the speaker 26 by a series of supports 30 that extend from the speaker housing 18. The supports 30 are spaced radially about the housing 18 for providing openings 32 between the reflector supports 30 for providing an outlet of the reflected acoustic vibrations.

The reflector 28 has a reflective surface 34 that is formed form an acoustically reflective material, such as glass or a veneer of a holographic film material. The reflective surface 34 is symmetrical about a center axis 36 of the reflective surface 34, which is also generally coaxial with the speaker 26. The reflective surface 34 has a generally arcuate central convex region 38 that extends towards the speaker 26. The reflective surface 34 also has a generally arcuate concave secondary region that is oriented around the central convex region 38.

The central convex region 38 is sized to reflect low frequency vibrations towards the speaker 26. For example, the central convex region 38 is sized to reflect vibrations of frequencies within the range of 20 Hz to 1,500 Hz towards the speaker 26. Midrange to high frequency vibrations reflect off the secondary region 40 and out of the luminaire and speaker assembly 12. The secondary region 40 is contoured to direct the midrange to high frequency vibrations such that these frequencies avoid the speaker 26. The midrange high frequency vibrations are in the range of 1,500 Hz to 20 kHz. Some of the low frequency vibrations also reflect off the central convex region 38 and out of the luminaire and speaker assembly 12. Therefore, some of the low frequency vibrations are reflected into the speaker 26; while reflection of midrange to high frequencies into the speaker 26 is eliminated.

Direct application of a cone speaker results in uneven sound distribution. In order to optimize efficiency for all frequencies, the central convex region 38 extends toward the speaker 26 to provide uniform distribution of the frequencies out of the luminaire and speaker assembly 12. Additionally, the low frequencies are reflected back to the speaker 26. Air that is moved by the speaker 26 is reflected off the central convex region 38 and back to the speaker 26. The reflected frequencies and air pressure amplify the back pressure of the speaker 26, thereby tuning the speaker 26. Additionally, by amplifying the back pressure of the speaker 26, a smaller resonating chamber 22 is permitted in comparison to resonating chambers that are sized for a speaker that does not have amplified back pressure. By reducing the size of the resonating chamber 22, the size of the speaker housing 18 is also reduced thereby minimizing the packaging required for concealing the speaker 26 and avoiding any drawback to the appearance of the overall luminaire and speaker assembly 12.

Figure 4:
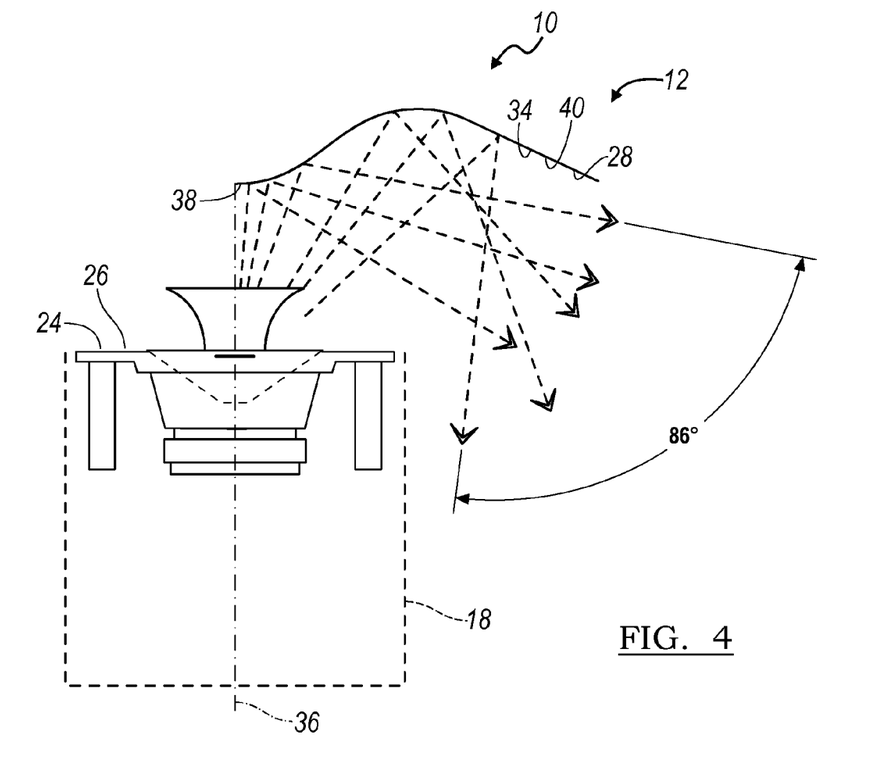
FIG. 4 is a partial schematic view of the media assembly of FIG. 2.

As illustrated in FIG. 4, the reflector 28 provides an output range that is greater than the output range of the speaker 26. For example, as illustrated in FIG. 1, a cone of 156 degrees is provided by the reflector 28 as opposed to a cone of seventy-eight degrees that would be provided by orienting the same speaker directly downward. Thus, not only is a larger range of acoustic vibration output permitted, the output range is also evenly distributed and tuned due to the geometry of the reflector 28.

An example of geometries for the reflector 28 and the luminaire and speaker assembly 12 are illustrated in FIG. 3, for utilization with a five inch diameter full range cone speaker 26. By utilizing the reflector 28, the reflective surface 34 is provided with an overall diameter of at least seventeen inches. The invention contemplates utilization of an output reflective surface of up to twenty-one inches in diameter or greater.

For utilization of the five inch full range cone speaker 26, the central convex region 38 is provided generally hemispherical with a radius of approximately 2.25 inches. The peak of the central region 38 may be spaced apart from the speaker 26 by approximately four inches. The arcuate secondary region 40 may have a radius of approximately four inches, which is offset from the center axis 36 by approximately 4.5 inches. Of course, the speaker 26 and/or the reflector 28 may be adjustable for tuning of the speaker 26 output.

Additionally, utilization of the reflector 28 optimizes the efficiency of the luminaire and speaker assembly 12. For example, by obtaining such a large output range from a five inch cone speaker 26, the power required to operate the speaker 26 is minimized; for example, the speaker 26 can be operated at eighteen watts.

Figure 5:
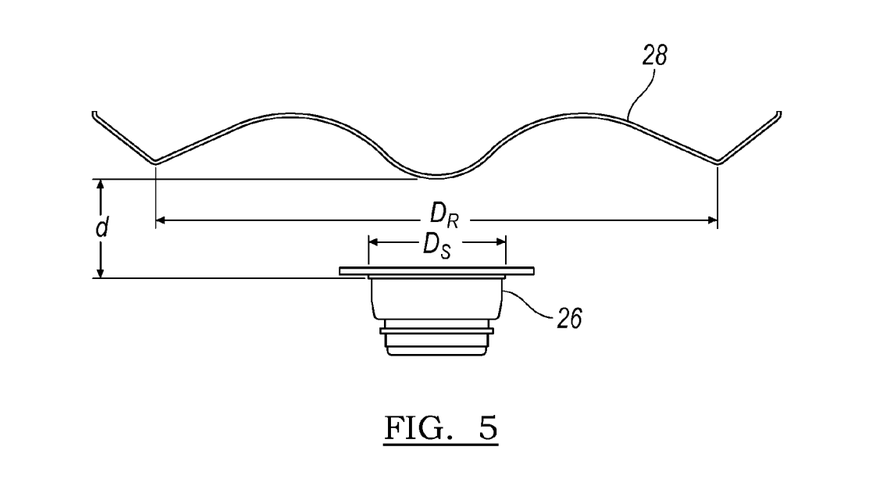
FIG. 5 is another schematic view of the media assembly of FIG. 2.

FIG. 5 illustrates a relationship of the speaker 26 and the reflector 28 schematically. Although specific dimensions for one embodiment have been described, the invention contemplates various sized speakers 26 and reflectors 28 within the spirit and scope of the invention. The relationship of these two components 26, 28 can be described linearly such that a reflector 28 can be fabricated for any size speaker 26 that is tuned to the particular sized speaker. For example, a ratio of a diameter DR of the acoustic reflective surface 34 of the reflector 28 to a diameter DS of the speaker 26 is approximately four to one. Further, a ratio of the diameter DR of the acoustic reflective surface 34 of the reflector 28 to a distance d between the speaker 26 and a peak of the central convex region 38 of the reflector 28 is approximately 5.7 to 1. Additionally, a ratio of the diameter DS of the speaker 26 to the distance d between the speaker 26 and the peak of the central convex region 38 of the reflector 28 is approximately 1.4 to 1.

The reflector 28 provides even sound distribution when compared to the prior art. For example, an acoustic uniformity test was conducted of the reflector 28 at a height of sixteen feet with an ambient noise level of 61 decibels. The readings were measured at ear height (five feet above ground) at various radii from center. At ten feet from center, a reading of 81.8 decibels was measured. At twenty feet from center, a reading of 76.6 decibels was measured. At thirty feet from center, a reading of 73.5 decibels was measured. At forty feet from center, a reading of 72.5 decibels was measured. At fifty feet from center, a reading of 69.4 decibels was measured. At sixty feet from center, a reading of 68.5 decibels was measured. Thus, an acoustic variance of less than fifteen decibels, specifically 13.3 decibels, can be provided by the media device 10.

Referring again to FIGS. 2 and 3, the reflector 28 includes a lens 34 that provides the reflective surface. The lens 34 is at least partially translucent. The lens may be employed to convey the light through defraction and/or diffusion. A primary light source 42 may be provided above the lens 34 for illuminating the lens 34 and conveying light through the lens 34, past the speaker housing 18, and to the underlying support surface 16 as illustrated by the peak light angle in FIG. 1. Thus, the combination of the luminaire and speaker assembly 12 provide both illumination and sound to overlapping regions beneath the luminaire and speaker assembly 12.

A secondary light source 44, such as a light emitting diode (LED) is also provided above the lens 34, adjacent the central convex region 38 for illuminating the lens 34 for conveying a signal or indication. For example, an LED 44, or series of LEDs 44 may be provided with different colors associated with different conditions. For example, a red LED 44 may illuminate the lens 34 to indicate an emergency situation. Alternatively, an LED 44 may illuminate the lens 34 to indicate a requirement of maintenance to the media assembly 10. Of course, various LEDs 44 and indication signals or colors may be conveyed by illumination of the lens 34.

The secondary light source 44 may be oriented upward; and the cap 46 may be translucent so that the secondary light source 44 illuminates the cap 46. The upward illumination of the secondary light source 44 may be employed to signal overhead aircraft and identify areas that may have an emergency warning.

Although the light sources 42, 44 are illustrated at various orientations above the reflector 28, the invention contemplates that various orientations may be employed, such as in contact with the reflector 28 or embedded in the reflector 28. The reflector 28 may be designed with various refraction capabilities for spreading the lightly uniformly, focused, in a pattern, or the like. Such design characteristics permit the illuminating feature of the reflector 28 to avoid affecting the sound reflection characteristics of the reflective surface 34.

Moreover, the media assembly 10 provides both the luminaire and speaker assembly 12, which conceals the speaker 26, while providing an efficient output of even sound distribution. By reflecting the sound wave downward, overlapping regions of light and sound may be provided, without mounting an external speaker to the structural pole 14 that would otherwise obfuscate or disrupt the ornamental appearance of the luminaire and speaker assembly 12. Additionally, by providing the speaker 26 at a height above the ear height, the acoustic vibrations may be uniformly conveyed downward, as opposed to reflected off the support surface 16, which may result in a limited range due to the source of the sound being provided beneath the ear height.

Due to orientation of the reflector 28 above the speaker 26, the reflector 28 may be utilized for preventing the speaker 26 from weather, contaminants or the like. Additionally, a cap 46 is provided above the reflector 28 for enclosing the reflector 28 for concealing the light sources 42, 44. A heat sink, photocell, or any other energy collection device may be utilized in combination with the luminaire and speaker assembly 12 for optimizing the efficiency of the luminaire and speaker assembly 12. Additionally, the reflector 28 may be adjustable to accommodate varying optical patterns of illumination or viewing angle of devices integrated with the optical lens 34 during installation.

Figure 6:
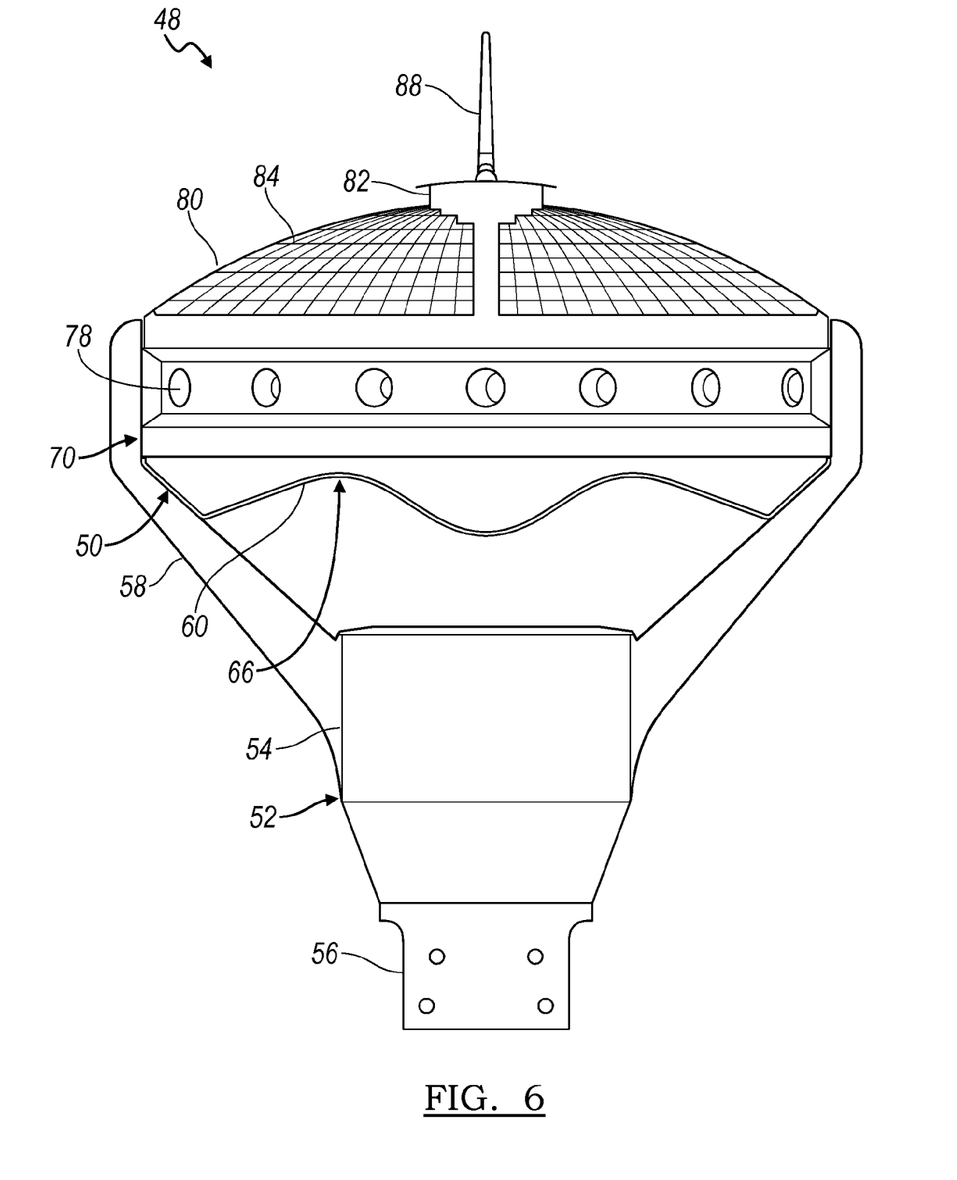
FIG. 6 is a side elevation view of a media assembly according to another embodiment.
Figure 7:
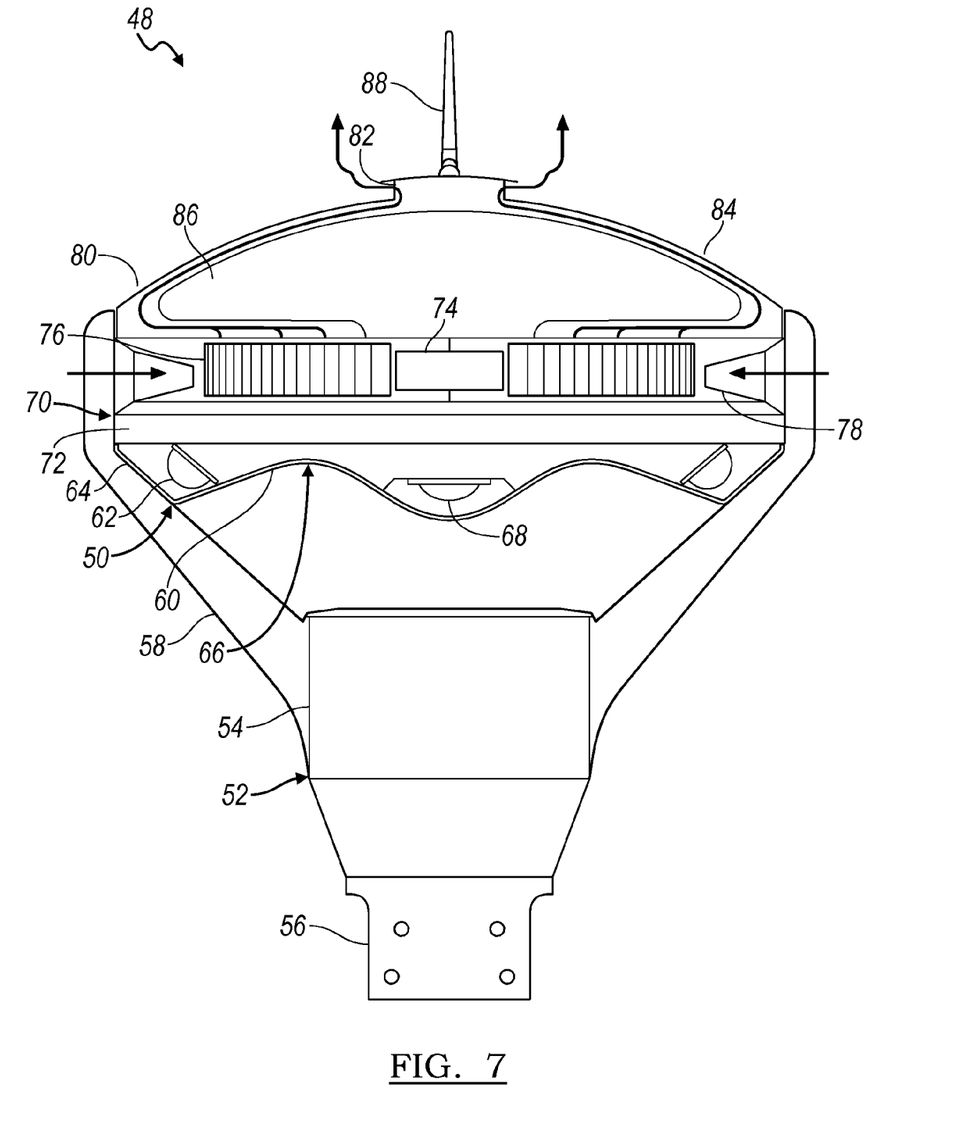
FIG. 7 is a partial section view of the media assembly of FIG. 6.

FIGS. 6 and 7 illustrate a media assembly 48 according to another embodiment. The media assembly 48 includes a luminaire 50 and a speaker assembly 52. The speaker assembly 52 includes a speaker housing 54, which may include an adaptor 56 for fastening the speaker housing 54 to a support structure. A plurality of supports 58 extend from the speaker housing 54 for supporting the luminaire 50. The luminaire 50 includes a reflector 60 for reflecting sound from a speaker within the speaker housing 54 as described in the previous embodiment.

The reflector 60 is formed from a translucent material, such as glass, and includes an array of LEDs 62 provided above the reflector 60 for conveying light through the reflector 60. The LEDs 62 are oriented about a periphery of the reflector 60 for providing a primary light source distributed from the luminaire 50. The LEDs 62 may also be oriented to convey light through a laterally outboard region 64, which may be outboard of a reflective surface 66 of the reflector 60. By spacing the LEDs 62 about the periphery, the heat generated by the LEDs 62 is distributed instead of a focused location when LEDs are clustered. Moreover, the LEDs 62 are arranged to distribute the primary light source from the luminaire 50 without affecting the sound characteristics of the speaker assembly 52 and the reflector 60.

An example of an applicable thoroughfare for employing the luminaire 50, is a typical four lane roadway, which would include fixtures or luminaires 50 spaced sixty feet along the length of a sidewalk, aligned with an opposing sidewalk with luminaires 50 that are forty-five feet apart measured laterally across a roadway. For a zone within the illuminated area, a range of maximum and minimum measurements spans 2.7 foot candles to 0.5 foot candles when an array of twelve LEDs 62 is employed. By utilizing LEDs 62, as opposed to conventional incandescent or halogen light sources, adequate lighting can be provided within the thoroughfare in combination with high quality sound output. Due to the reduced energy requirements of the LEDs as opposed to conventional incandescent light sources, energy costs can be greatly reduced.

Additionally, utilization of LEDs 62 provides more flexibility in lighting output by permitting various lighting features such as dimming of the lights, increased intensity of the lighting, emergency lighting, or various signals or displays. Additionally, a secondary light source such as an LED 68 can be oriented centrally above the reflector 60, as in the prior embodiments, for providing an illuminated signal, or the like for conveying a message from the luminaire 50.

Although the luminaires 12, 50 are illustrated and described with various light sources, the invention contemplates utilization of any suitable light source, including metal halide light sources, organic LEDs (with rings at different brightness levels), or the like, for providing the desired output lighting from the media assembly 10, 48.

Referring again to FIG. 6, the luminaire 50 includes a housing 70 for encasing the light sources 62, 68. Referring to FIG. 7, a lighting module 72 is provided within the housing 70 for controlling the operations of the LEDs 62, 68. The lighting module 72 may provide a power source, such as a battery, which may operate as the primary power source for the LEDs 62, 68; or according to another embodiment the battery may provide a secondary power source for powering the LEDs 62, 68 when the primary power source is not available, or when the primary power source is unnecessary. For example, the primary power source may be hardwired electricity, and in the occurrence of a power failure, the secondary power source may be employed for powering the LEDs 62, 68. Alternatively, when the secondary power source has stored adequate power for powering the LEDs 62, 68, the secondary power source may be employed for reducing electricity costs.

As illustrated in FIG. 7, a generator 74 may be provided on the lighting module 72. A turbine 76 is mounted to the generator 74 such that rotation of the turbine 76 provides rotary motion to the generator 74. The generator 74 converts the rotary motion to electricity, which is stored in the power source within the lighting module 72.

Referring again to FIGS. 6 and 7, the luminaire housing 70 includes a radial array of venturi inlets 78 for permitting ambient air, such as that generated by the wind to enter the housing 70 and to drive the turbine 76. The housing 70 includes a cap 80 with an exhaust vent 82. Ambient air that is conveyed by environmental forces enters the inlet 78, drives the turbine 76 and passes through the cap 80 and out of the exhaust vent 82. Air movement within the housing 70 is increased by natural convection as the external air is heated by heat that is generated by the light sources 62, 68 and applicable electronics. Additionally, photovoltaic cells 84 are provided externally upon the cap 80 for capturing solar energy, and storing it in the power storage of the lighting module 72.

A communications module 86 may be provided within the housing 70 for receiving and/or transmitting signals associated with the control of the media assembly 48. A path for a flow of air within the housing 76 may be provided around the control module 86 for also cooling the control module 86. An antenna 88 can be provided upon the cap 80 for transmitting and receiving the signals for the communications module 86.

The luminaire 50 provides efficiencies and reduced energy costs by employing LEDs 62, 68 as light sources. Additionally, the media assembly 48 collects solar energy and generates electricity from wind power for powering the LEDs 62, 68 during power losses, or when adequate power is stored thereby eliminating the need of the hardwired electrical power source. Additionally, the venting of heat that may be provided by the luminaire 50 and/or the associated electronics in the lighting module 72 and the communications module 86 may assist in the generation of power by the generator 74.

The cap 80 is designed to protect the components within the housing 70 from the elements, and is adequately sloped to convey rain or snow away from the housing 70. Additionally, the sloping may be adequate to discourage birds from occupying a top surface of the cap 80, which is employed for the collection of solar energy. The sloping also extends the antenna 88 above the housing. The cap 80 is adequate for diffusing any light within the housing 70 so that light that exits the luminaire housing 70 is limited to the light that is conveyed through the reflector 60.

Although solar energy is collected by the photovoltaic cell 84, the sun may also generate heat within the housing 70 due to a greenhouse effect on the cap 80. The exhaust vent 82 permits the collected heat to heat ambient air within the housing 70, which thereby exits through the exhaust vent 82, causing air to be pulled into the venturi inlets 78 thereby driving the turbine 76.

Additionally, vents may be provided above the LEDs 62, 68 so that heat generated by these light sources heats ambient air within the housing 70, which is then subsequently conveyed through the turbine 76. If a light source is utilized that has a higher energy loss than LEDs, such as an incandescent bulb, additional heating and therefore energy recovery may be experienced.

The invention contemplates that the media assemblies 10, 48 may incorporate a variety of additional features beyond audio and lighting. For example, sensors may be employed to measure temperature, moisture, air quality, radiation, wind velocity and the like. Cameras may be utilized for surveillance or for live monitoring of the applicable thoroughfare. The media assemblies 10, 48 may also include receivers and/or transmitters, such as radio frequency or infrared, for analysis and/or on-site monitoring. Power and data interfaces or receptacles may be provided in the media assemblies for additional lighting (such as temporary or holiday lighting), signage, decorations, or the like. Each of these additional components may be oriented in the housings of the media assemblies 10, 48. The various features of the media assemblies may be controlled by the known techniques, such as those disclosed in U.S. Patent Application Publication Number 2007/0055389 A1, which published to Ronald Harwood on Mar. 8, 2007, now U.S. Pat. No. 7,630,776 B2, the disclosure of which is incorporated by reference herein.

Figure 8:
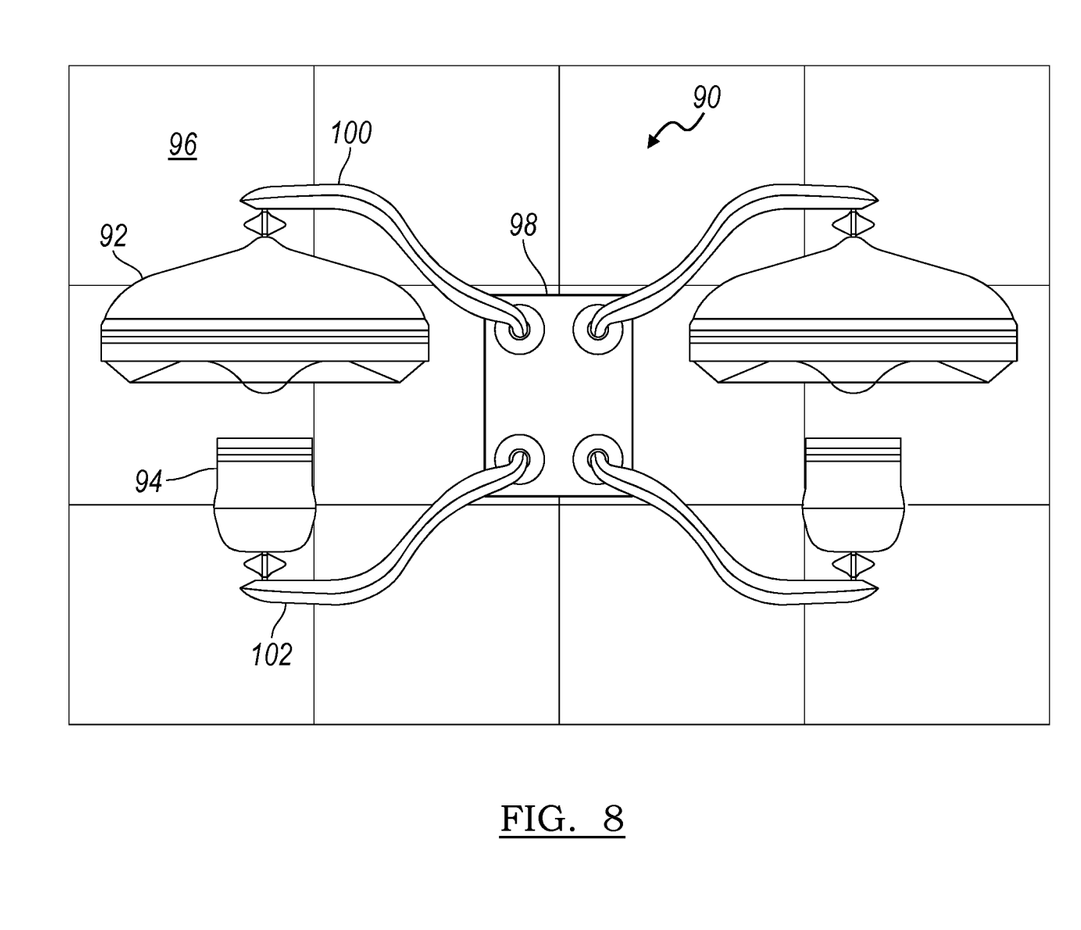
FIG. 8 is a front elevation view of a media assembly according to another embodiment.

FIG. 8 illustrates another media assembly 90 for wall mounting a pair of luminaires 92 and speaker assemblies 94 to a wall 96. The media assembly 90 includes a mounting plate 98 for mounting directly to the wall 96. A series of brackets 100, 102 extend from the mounting plate 98 and support the luminaires 92 and speaker assemblies 94. Thus, the various luminaire and speaker housing embodiments may be employed mounted to the wall 96.

Figure 9:
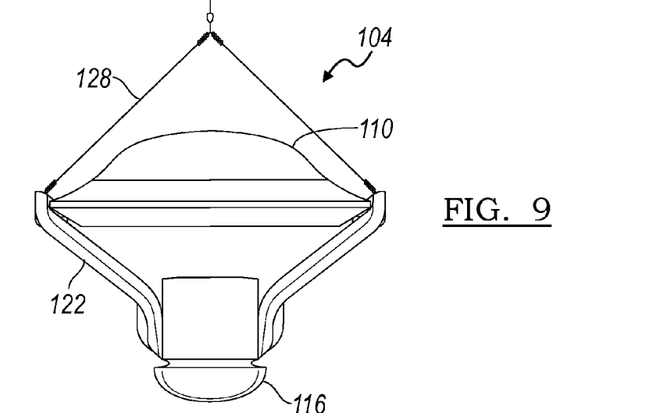
FIG. 9 is a front elevation view of a media assembly according to yet another embodiment.
Figure 10:
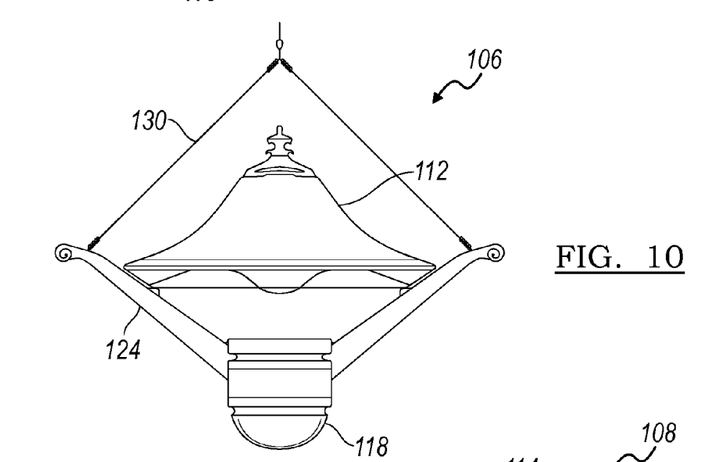
FIG. 10 is a front elevation view of a media assembly according to yet another embodiment.
Figure 11:
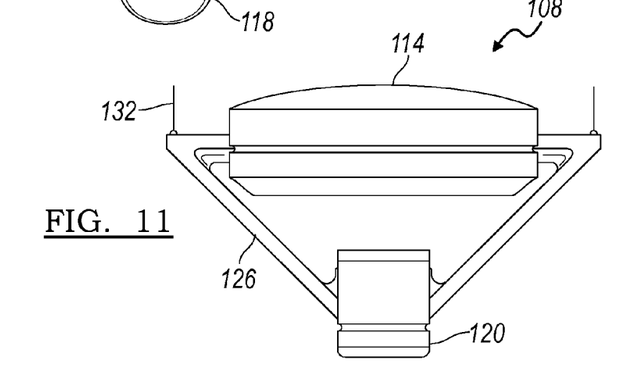
FIG. 11 is a front elevation view of a media assembly according to yet another embodiment.

FIGS. 9-11 illustrate various media assemblies 104, 106, 108 that may be employed for catenary lighting. Each of the media assemblies 104, 106, 108 includes a luminaire 110, 112, 114 and a speaker assembly 116, 118, 120. Each of the luminaires 110, 112, 114 and speaker assemblies 116, 118, 120 are interconnected and supported by a series of brackets 122, 124, 126. The media assemblies 104, 106, 108 are each supported by cables 128, 130, 132 that support the media assemblies 104, 106, 108 at an elevation and also provide wiring to the luminaires 110, 112, 114 and speaker assemblies 116, 118, 120.

Figure 12:
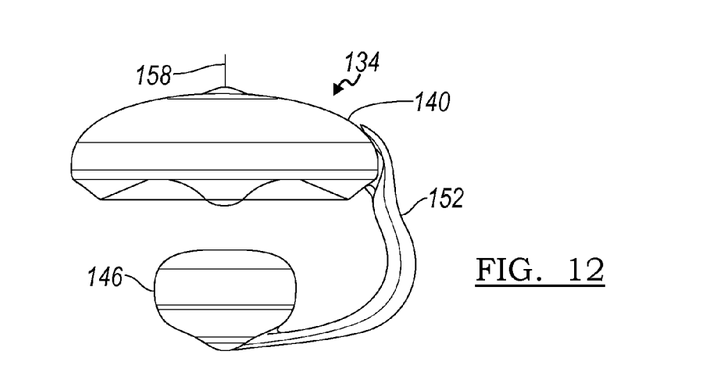
FIG. 12 is a front elevation view of a media assembly according to yet another embodiment.
Figure 13:
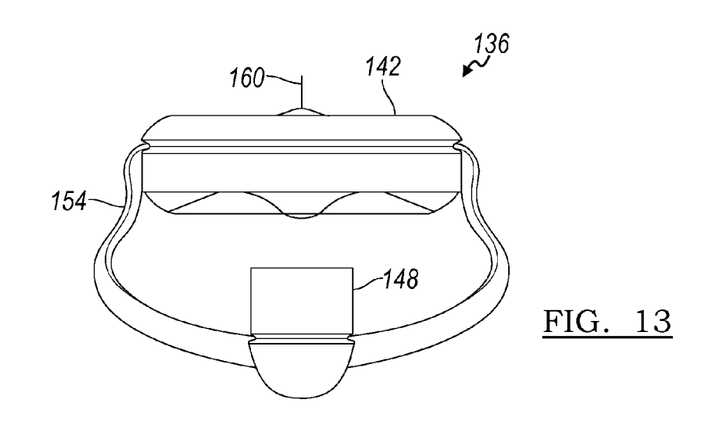
FIG. 13 is a front elevation view of a media assembly according to yet another embodiment.
Figure 14:
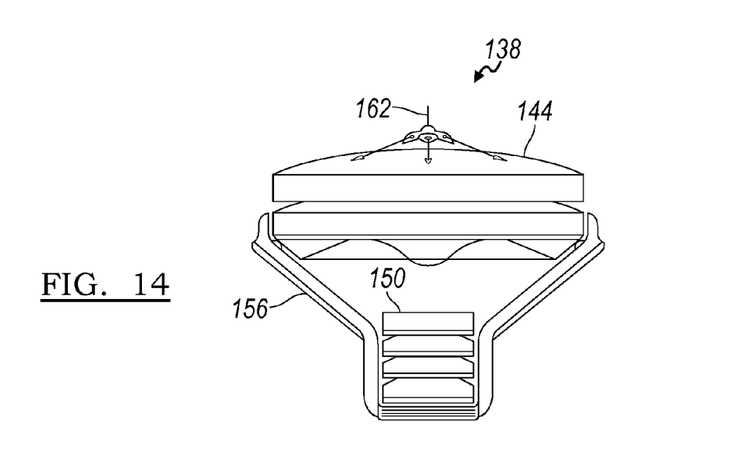
FIG. 14 is a front elevation view of a media assembly according to yet another embodiment.

FIGS. 12-14 illustrate various media assemblies 134, 136, 138 that may be employed for pendant lighting. Each of the media assemblies 134, 136, 138 includes a luminaire 140, 142, 144 and a speaker assembly 146, 148, 150. Each of the luminaires 140, 142, 144 and speaker assemblies 146, 148, 150 are interconnected and supported by a series of brackets 152, 154, 156. The media assemblies 134, 136, 138 are each supported by cables 158, 160, 162 that support the media assemblies 134, 136, 138 at an elevation and also provide wiring to the luminaires 140, 142, 144 and speaker assemblies 146, 148, 150.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed is:

1. A media assembly comprising:
   a housing having an inlet and an outlet;
   a media device oriented in the housing for providing a media operation;
   a generator mounted in the housing in electrical communication with the media device;
   a fan operably connected to the generator and oriented in the housing so that air that passes into the housing through the inlet and out of the housing through the outlet, causes the fan to rotate thereby operating the generator and providing a power source to the media device; and
   a battery in electrical communication with the generator for storing power generated by the generator, and in electrical communication with the media device for powering the media device.

2. The media assembly of claim 1 wherein the media device comprises a light source.

3. The media assembly of claim 2 wherein the inlet is oriented above the light source so that ambient air that is heated by the light source, rises through the inlet, thereby rotating the fan, and subsequently exiting the outlet.

4. The media assembly of claim 1 wherein the light source comprises an array of light emitting diodes.

5. The media assembly of claim 1 wherein the fan comprises a turbine.

6. The media assembly of claim 5 wherein the inlet is provided by a venturi intake oriented in the housing so that environmental ambient air flows through the venturi intake and rotates the turbine.

7. The media assembly of claim 1 further comprising a solar collector provided on the housing in electrical communication with the battery for generating power from solar exposure and for storing power in the battery.

8. The media assembly of claim 1 wherein the housing comprises a cap with an exhaust vent.

9. The media assembly of claim 1 wherein the media device is provided in air path between the inlet and the outlet so that heat generated by the media device is convected from the media device.

10. A media assembly comprising:
    a housing having an inlet and an outlet;
    a media device oriented in the housing;
    a generator mounted in the housing in electrical communication with the media device;
    a fan operably connected to the generator and oriented in the housing so that air that passes into the housing through the inlet and out of the housing through the outlet, causes the fan to rotate thereby operating the generator and providing a power source to the media device.

11. The media assembly wherein the inlet is oriented above the media device so that ambient air that is heated by the media device, rises through the inlet, thereby rotating the fan, and subsequently exiting the outlet.

12. The media assembly of claim 10 wherein the media device source comprises an array of light emitting diodes.

13. The media assembly of claim 10 wherein the fan comprises a turbine.

14. The media assembly of claim 13 wherein the inlet is provided by a venturi intake oriented in the housing so that environmental ambient air flows through the venturi intake and rotates the turbine.

15. The media assembly of claim 10 wherein the housing comprises a cap with an exhaust vent.

16. The media assembly of claim 10 wherein the media device is provided in air path between the inlet and the outlet so that heat generated by the media device is conveyed from the media device.

17. A media assembly comprising:
    a housing;
    a speaker mounted to the housing;
    a generally translucent acoustic reflector spaced apart from and facing the speaker for reflecting acoustic vibrations past and outboard of the housing to a first region;
    a primary light source oriented proximate to the reflector to convey light through the reflector, past and outboard of the housing for illuminating a second region that at least partially includes the first region; and
    a secondary light source for illuminating the reflector for conveying an illumination signal.

18. The media assembly of claim 17 wherein the secondary light source further comprises at least one light emitting diode (LED).

19. The media assembly of claim 17 wherein the secondary light source is oriented adjacent to a central convex region of the reflector.

* * * * *

UNITED STATES PATENT AND TRADEMARK OFFICE
CERTIFICATE OF CORRECTION

PATENT NO.         : 8,477,967 B2                                    Page 1 of 1
APPLICATION NO.    : 13/330103
DATED              : July 2, 2013
INVENTOR(S)        : Ronald Paul Harwood et al.

It is certified that error appears in the above-identified patent and that said Letters Patent is hereby corrected as shown below:

On the Title Page, Item (63):

Delete:

"Related U.S. Application Data
(63)   Continuation of application No. 12/631,943 filed on Oct. 7, 2009, now Pat No. 8,098,852"

and

Insert:

-- Related U.S. Application Data
(63)   Continuation of application No. 12/631,943 filed on Dec. 7, 2009, now Pat No. 8,098,852 --.

In the Claims:

Column 10, Line 10, Claim 11
After "media assembly" insert -- of claim 10 --.

Signed and Sealed this
First Day of April, 2014

Michelle K. Lee
*Deputy Director of the United States Patent and Trademark Office*